3,356,351
VERTICAL LIME KILN
James E. Roberts, Ashtabula, and James B. Wilson, Amherst, Ohio, assignors to Union Carbide Corporation, a corporation of New York
Filed Sept. 10, 1965, Ser. No. 486,443
2 Claims. (Cl. 263—30)

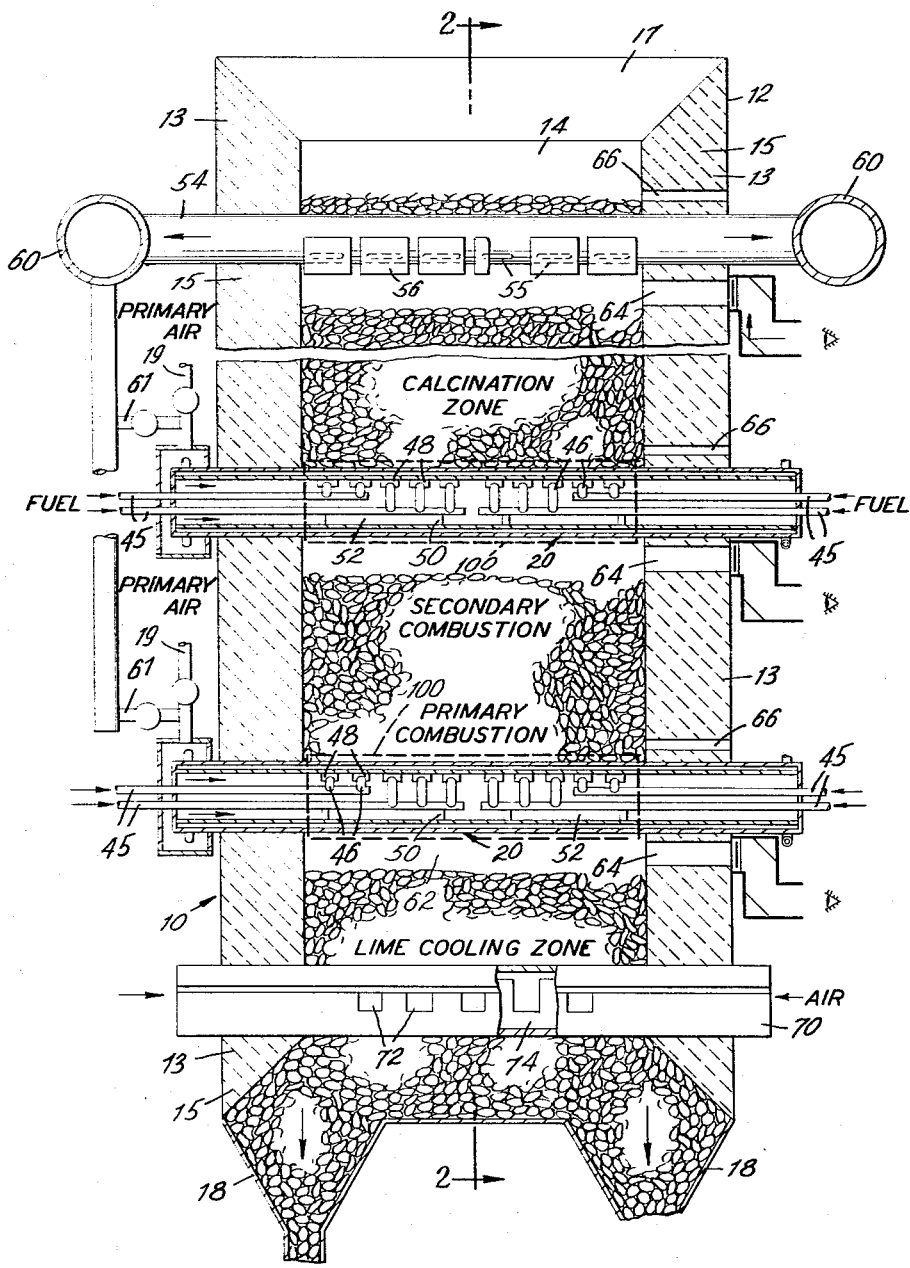

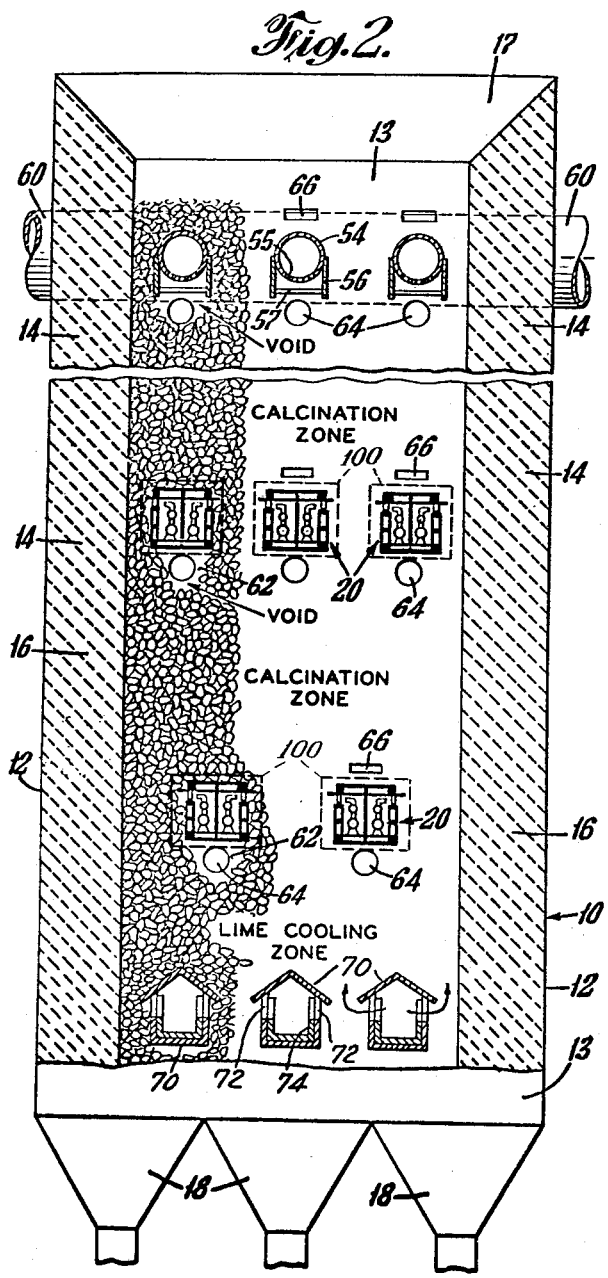
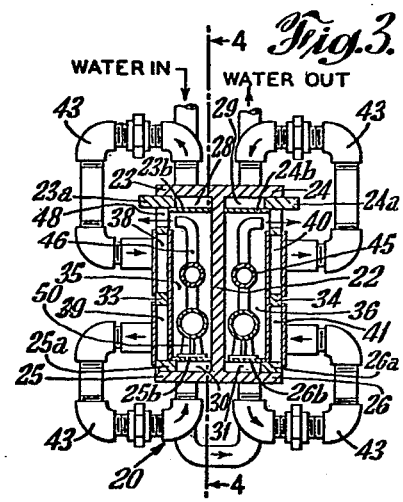
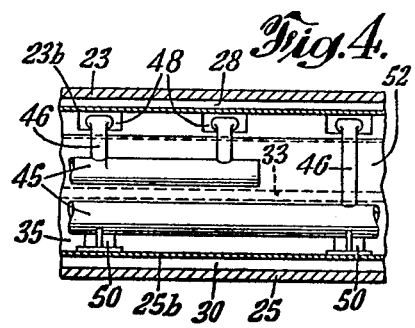
INVENTORS
JAMES E. ROBERTS
JAMES B. WILSON
ATTORNEY Dec. 5, 1967  J. E. ROBERTS ET AL  3,356,351
VERTICAL LIME KILN
Filed Sept. 10, 1965  3 Sheets-Sheet 3
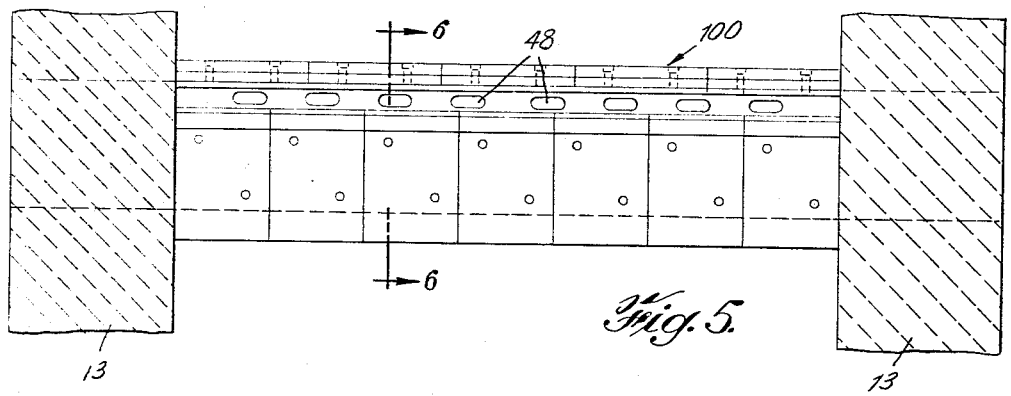
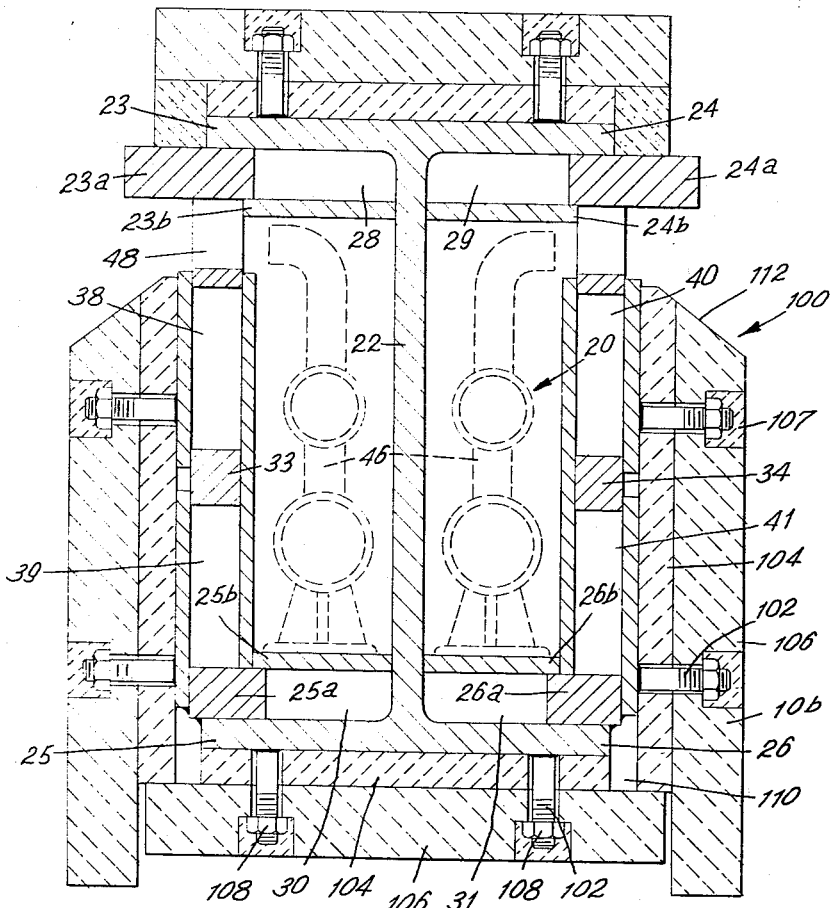
INVENTORS
JAMES E. ROBERTS
JAMES B. WILSON
BY
ATTORNEY

# United States Patent Office 3,356,351
Patented Dec. 5, 1967

ABSTRACT OF THE DISCLOSURE

A vertical kiln for the production of lime from limestone employing a plurality of horizontally extending water-cooled, fluid fueled burner devices which are substantially covered by a closely contacting refractory lining.

---

The present invention relates to vertical lime kilns. More particularly, the present invention relates to an improved burner arrangement for fluid fuel fired vertical lime kilns.

A fluid fuel fired vertical kiln which has been found to provide very high efficiency and product quality is disclosed in United States Patent 2,933,297 to Erasmus et al. In the Erasmus et al. kiln, water-cooled metal burner beams arranged horizontally to extend across the shaft of a vertical kiln whereby the limestone charge which is fed to the kiln passes over and around the burner beams and is subjected to substantially uniform heating. Additionally, with this arrangement a void in the charge develops under the horizontally disposed burner beams which permits convenient visual observation of the movement of the charge, whereby the formation of "hangs" can be detected and the uniformity of heating determined.

The horizontal water-cooled burner beams are an essential part of the Erasmus et al. kiln and contribute importantly to the efficiency of the kiln and the production of high quality product.

In studying the heat balance of the kiln however, it was determined that a heat loss of about 6% was attributable to the cooling water which is circulated through the metal burner beams. This cooling water is necessary, particularly with the steel burner beams most often employed, in view of the kiln operating temperatures which are on the order of 1000° C. to 1400° C.

Since water-cooling of the burner beams in the Erasmus et al. kiln has been found to be necessary in most commercial applications in order to permit continuous efficient high temperature operation without damage to the burner beams, it is of considerable economic importance that the heat losses due to water-cooling be reduced as much as possible without interfering with the otherwise excellent operating characteristics of the kiln.

It is therefore an object of the present invention to provide means for avoiding heat losses in vertical kilns which employ water-cooled metal burner beams.

Other objects will be apparent from the following description and claims taken in conjunction with the drawing in which:

FIGURE 1 is a sectional elevational view of a vertical lime kiln employing water-cooled burner beams;

FIGURE 2 is a sectional view of the kiln shown in FIGURE 1 taken along the line 2—2;

FIGURE 3 is an enlarged sectional view of water-cooled burner beam taken along the line 3—3 in FIGURE 1;

FIGURE 4 is a sectional view taken along line 4—4 in FIGURE 3;

FIGURE 5 is an elevation view of an embodiment of the present invention for reducing heat losses in a water-cooled burner beam, and FIGURE 6 is a sectional view taken along line 6—6 of FIGURE 3.

With reference to the drawing, FIGURES 1 through 4 show the kiln of the Erasmus et al. Patent 2,933,297 and these figures are presented, together with the immediately following description in order to illustrate the type of kiln in which the improvement of the present invention is applicable.

Referring particularly to FIGURES 1 and 2, a lime burning kiln is indicated at 10 comprising a vertical shaft 12 of rectangular cross section having end walls 13 and 14, refractory linings 15 and 16 and conventional charging chutes 17 located at the top of the kiln for the introduction of the material to be treated, for example crushed limestone into the feed zone. Discharge chutes 18 at the bottom of the kiln 10 permit the removal of the lime product, provision being made for the passage of secondary air upwardly into the kiln shaft through the cooling zone and calcining zone in order to simultaneously preheat the air and cool the emerging lime product in the lime cooling zone. The secondary air may be introduced either upwardly through chutes 18 or by means of air duct 70. Primary air is introduced by way of inlet 19 through conduit 52 as hereinafter more fully described.

The calcination of the feed material, under controllable temperature conditions, is accomplished by the provision of a plurality of high strength structural beams 20, made of steel or other temperature-resistant material extending horizontally across the calcining zone, and supported at opposite ends by the end walls 13—13, the beams extending outwardly beyond said walls. These beams are vertically and horizontally spaced from each other, and disposed in staggered relation in order to provide channels affording maximum distribution of the fuel mixture in the kiln. Any number and arrangement of beams may be employed in the practice of the invention, five beams disposed in staggered arrangement and in two rows at different levels no beam vertically being aligned with another beam, is suitable and is shown and illustrated in FIGURE 2.

With particular reference to FIGURES 3 and 4 each of the beams 20 is preferably a wide flange beam having a vertical web 22 provided with laterally extending upper flanges 23, 24 and lower flanges 25, and 26. The ends of the flanges 23, 24, carry short extension members or lips 23a, 24a, which project laterally from the underside of the flanges, and slightly beyond the lateral extremities thereof. Similar flange members 25a, 26a, joined to the topside of flanges 25, 26, terminate flush with the lateral ends of their respective flanges. Welded to the flange members 23a, 24a, 25a and 26a, and to the central web 22, are rectangular duct plates 23b, 24b, 25b, 26b, respectively, to form therewith longitudinal, rectangularly cross sectioned, cooling ducts 28, 29, 30 and 31 for cooling the beam 20. Side walls 33 and 34 connect the lateral extremities of the duct plates to form longitudinal passageways 35 and 36 for conducting gases into the kiln. These side walls 33 and 34 may be provided with longitudinal, cooling ducts 38, 39, 40 and 41, similar to ducts 28, 29, 30 and 31. Cooling water is passed in series through these ducts by water tight connectors or loops 43 between adjacent ends of the longitudinal ducts to provide a continuous serpentine path for the circulation of water therethrough. Thus, cooling water supplied to duct 28 passes sequentially through ducts 38, 39, 21, 41, 40 and leaves through duct 29. The connectors 43 may be made detachable so that individual beam units may be conveniently withdrawn for repair or replacement.

Referring again to FIGURE 1, calcination is accomplished by means of combustible fuel mixtures which are drawn into direct contact with the material in the calcination zone through one or more combustible fuel lines or pipes 45 having longitudinally spaced and laterally extending outlet ports 46. The exiting fuel from the fuel outlets 46 enters the calcination zone through slotted openings 48 in the side walls 33, 34, the total cross section of these openings being less than or equal to 60 percent of the total cross sectional area of the passageways 35, 36, not occupied by the fuel lines 45. Any suitable number and arrangement of fuel lines 45, outlets 46 and slotted openings 48 may be used, the lines 45 being shown and illustrated herein in vertically spaced tiers in each passageway, and supportingly held therein by pipe supports 50. As illustrated in FIGURE 1, the fuel lines 45 may be blind end pipes disposed in duplicate pairs on each passageway, each pair being adapted to introduce combustible fluid fuel at spaced intervals as far as the center of the calcination zone of the kiln. The openings 48 are shown in registry with the outlets 46, but obviously other and different arrangement may be equally as feasible.

Control of the combustion temperature of the ejected fuel in pipes 45 is achieved by utilizing the space within the passageways 34, 36 not occupied by the fuel lines 45 as additional conduits 52 for the admission of either air or diluent gases such as recycled products of combustion. These conduits 52 may be compartmentalized if so desired to avoid mixing of the fluids admitted from opposite ends of the beam 20, thereby further ensuring even distribution of the fuel. Inasmuch as complete combustion of the fuel in the line 45 will result in temperatures greatly in excess of 1400° C., the fluid in fuel line 45 and conduits 52 may be admitted into the calcination zone through the slotted openings 48 in such proportions as to limit the amount of primary oxygen that is made available to the fuel, so that combustion of the fuel mixture may be distributed into several stages of combustion. For this purpose the fuel mixture admitted into the lowermost level of the calcining zone may comprise an excess of fluid fuel with sufficient oxygen-bearing gases to give a flame temperature of about 1200–1400° C. in the immediate vicinity of the lower beams. The fluid fuel which is only partially burnt due to the controlled oxygen deficiency in this primary stage of combustion, is then available for admixture and secondary combustion with the ascending preheated air from secondary air tubes 70. The additional flame brought about by second combustion will produce only a moderate rise in temperature, due to the limited concentration of combustible gas in this partially burnt fuel.

In the meantime, primary combustion of excess fuel and oxygen-bearing gas at the upper beam level also produces a temperature of approximately 1200–1400° C., thereby making available additional partially burnt fuel for the remaining oxygen in the ascending preheated air.

Excessive temperature rise at this upper level is further inhibited due to the limited amount of remaining oxygen in the ascending preheated air, and also because of the dilution of this preheated air with the products of combustion from the lower combustion level. As a consequence, the combustible fuel mixtures obtained from lines 45 and conduits 52 are controllably released in several stages of combustion, so that at no point in the calcination zone is an excessive temperature condition encountered.

To remove the gases of combustion, the upper portion of the shaft 12 may be provided with one or more suitably formed off-take tubes or pipes, such as inverted trough-like conduits and preferably in the form of cylindrical off-take pipe 54 horizontally spanning the shaft 12, and extending outwardly beyond the walls 13—13. As illustrated here in FIGURE 5, suitable apertures 55 in the lower halves of the pipes 54 serve as inlets for admitting gas from the upper end of the shaft.

As a feature of the kiln, the efficiency of the exhaust gas removal from the kiln is considerably enhanced by the attachment of skirts or side plates 56, tangentially secured in pairs to opposite sides of the off-take pipes 54, and depending therefrom. Since the pressure of the limstone moving downward might tend to fold these skirts inward, brace bars 57 secured to the lower ends of each pair of plates 56 are employed to hold them separated and in a vertical position. The skirt attachments thus permit a larger area from which the gas may be withdrawn through the apertures 55. A substantial reduction is thus made in the exhaust gas velocity from the bed of limestone.

With the above arrangement the off-take pipes 54 eliminate the exhaust gases by suction through a suction blower (not shown) in a manifold 60. A portion of the combustion products in the manifold 60 may be recycled to a lower portion of the calcination zone, or into the passageways 35, 36 in the beams 20 through a valve-controlled, return line 61 to further control and modify the flame temperature inside the calcination zone.

A further feature of the kiln resides in the employment of multiple air tubes 70 horizontally mounted across the kiln in a manner similar to beams 20 and disposed slightly above the discharge chutes 18. The air tubes are connected to a source of air (not shown) and are provided with a series of horizontally spaced apertures 72 for supplying secondary air to the kiln. A slide 74 disposed inside the tube 70 and having apertures in registry with the apertures 72 serves to adjustably control the size of the aperture openings 72. In this manner an adjustable and uniform distribution of secondary air across the kiln may be effected.

In combination with the aforedescribed kiln, the present invention comprises the provision of a refractory covering for the water-cooler burner beams 20, as shown schematically in FIGURES 1 and 2 at 100, and in detail in FIGURES 5 and 6.

With particular reference to FIGURES 5 and 6, a burner beam 20 is shown extending between the side walls 13 of a vertical kiln.

This burner beam 20 is suitably formed of steel and is provided with passages 38, 39, 40 and 41 for the circulation of cooling water as previously described in connection with FIGURE 3.

In order to reduce the heating of the water which circulates in the aforementioned passages, a refractory covering indicated generally at 100 is provided around the burner beam to substantially enclose the burner beam except for the portion containing outlets 48 through which fuel and air are introduced into the kiln.

In the embodiment shown in FIGURES 5 and 6, threaded studs 102 are welded to the walls of the burner beam as shown to pass through and support the refractory slabs 104 and 106 which are rigidly secured to the beam by means of nuts 108.

Slabs 104, which are suitably formed of insulating refractory rated for service at 1900–2800° F. are arranged flush with the walls of the burner beams as shown in the drawings to provide a close fitting contact therewith so that there are essentially no sizeable air-spaces between the slabs and the opposite burner beam surface. This is an important feature of the present invention since a close-fitting contact between the refractory and burner beam is necessary in order to provide a satisfactory thermal relationship whereby adequate protection is provided for the burner beam without resulting in large heat losses by way of the cooling water.

Air spaces, of only minor proportions, such as shown at 110, which result on account of the inconvenient shape of the beam are permissible, but not desirable and preferably these spaces are filled with refractory, e.g., castable refractory.

In addition to refractory slabs 104 additional refractory slabs 106 are arranged in close-contact as shown to provide a suitable outer surface for contact with the kiln charge. Slabs 106 are shaped to provide a sloping surface at 112 so as to avoid any solid material buildup in the vicinity of outlets 48. These outer slabs are preferably formed of highly erosion-resistant and high temperature refractory such as high fired brick containing 40–90%

MgO. The bores 109 in which nuts 108 are located are suitably filled with castable refractory.

A particular advantage of the present invention is that the refractory coating need not be very thick and can be of a size which does not interfere with the passage of charge and product through the kiln.

For example, with burner beams of the type shown in the drawing having an overall cross section of 16¼″ x 18⅜″ with cooling water passages formed of ⅜ inch plate, a refractory covering of 3 inch total thickness was sufficient to reduce the heat loss from about 6% to 2½% with product recovery and quality being essentially unchanged. In this particular arrangement, the inner slabs formed of insulating refractory were one inch thick and the outer slabs, formed of 70% $Al_2O_3$ brick were 2 inches thick.

Although the embodiment illustrated in the drawing shows the refractory covering being formed of a plurality of refractory slabs, it is possible to employ an essentially monolithic close-fitting refractory coating. Such a coating can be provided by applying a refractory mix to the burner beams, for example by troweling, gunning or ramming and subsequently firing the applied refractory.

By way of example castable refractory mix can be applied to the burner beam by gunning to a thickness of about 2–3 inches and subsequently fired at 2000° F. for about 6 hours.

Normal kiln start-up procedures can also provide the proper firing conditions for achieving the bond required in the refractory mix.

In addition to the particular stud supporting arrangement shown in the drawing, it is possible to install other anchoring devices, e.g. expanded metal, metal anchors, etc. to hold the refractory to the beam. A metal ledge can also be attached to the lower part of the beam to support the refractory.

The following table shows commercially available refractory materials suitable for use in the practice of the present invention.

|  | Castable Refractory | | | | Insulating Refractory | | | Outer Slab |
|---|---|---|---|---|---|---|---|---|
| $SiO_2$ | .03 | 30.53 | 2.2 | 7.2 | 45.4 | 43.17 | 40.08 | High fired brick. (40-90% MgO; 40-90% $Al_2O_3$ brick). |
| $Al_2O_3$ | 93.65 | 62.90 | .3 | 0.6 | 37.7 | 17.29 | 36.33 | |
| $Fe_2O_3$ | .27 | 1.30 | .6 | 7.8 | 1.0 | 3.11 | 2.91 | |
| $TiO_2$ | Trace | 1.97 |  |  | 1.3 | 0.39 | 1.80 | |
| CaO | 5.40 | 2.22 | 1.1 | 1.4 | 14.2 | 30.14 | 13.06 | |
| MgO | 0.12 | .07 | 94.9 | 83.0 | 0.1 | 1.20 | 0.47 | |
| Alkalies | .11 | .46 |  |  | 0.1 | 2.05 | 1.66 | |

What is claimed is:

1. In a kiln for the production of lime from limestone which includes:
   (1) a vertical shaft having
      (a) a feed zone in the upper portion thereof through which a charge is introduced for passage downwardly through the shaft
      (b) a calcining zone in said shaft below the feed zone in which said charge is heated to form lime and
      (c) a cooling zone in the lower portion of the shaft below said calcining zone for receiving product from said calcining zone and from which said product is discharged from said shaft.
   (2) means for introducing air into the lower end of the shaft to rise successively through at least the cooling zone and the calcining zone so as to cool the product and at the same time preheat the air before it passes into the calcining zone
   (3) a plurality of horizontal hollow metal beam members extending across the calcining zone, each having oppositely disposed lateral openings along the length of the beam and
   (4) fluid fuel conduits and primary combustion air conduits located within said beams, said conduits having outlets positioned to discharge fuel and air mixtures through said openings in substantially uniform amounts along the length of the beam and said hollow beam members having a plurality of longitudinally extending ducts for the circulation therethrough of cooling water; the improvement in combination therewith which comprises:
   a refractory lining affixed to the outer surfaces of said metal beams and being in close contact therewith, said refractory lining being arranged to substantially cover the portions of the beams located within said kiln shaft without obstructing the outlets of the conduits located within said beams.

2. In a kiln for the production of lime from limestone which includes:
   (1) a vertical shaft having
      (a) a feed zone in the upper portion thereof through which a charge is introduced for passage downwardly through the shaft
      (b) a calcining zone in said shaft below the feed zone in which said charge is heated to form lime and
      (c) a cooling zone in the lower portion of the shaft below said calcining zone for receiving product from said calcining zone and from which said product is discharged from said shaft
   (2) means for introducing air into the lower end of the shaft to rise successively through at least the cooling zone and the calcining zone so as to cool the product and at the same time preheat the air before it passes into the calcining zone
   (3) a plurality of horizontal hollow metal beam members extending across the calcining zone, each having oppositely disposed lateral openings along the length of the beam and
   (4) fluid fuel conduits and primary combustion air conduits located within said beams, said conduits having outlets positioned to discharge fuel and air mixtures through said openings in substantially uniform amounts along the length of the beam and said hollow beam members having a plurality of longitudinally extending ducts for the circulation therethrough of cooling water; the improvement in combination therewith which comprises:
   a plurality of contiguous refractory slabs individually affixed to the outer surfaces of said beams and being arranged in close contact with said beams, said refractory slabs being arranged to substantially cover the portions of the beams located within said kiln shaft without obstructing the outlets of the conduits located within said beams.

References Cited

UNITED STATES PATENTS

| | | | |
|---|---|---|---|
| 2,861,788 | 11/1958 | Suter | 263—30 |
| 2,933,297 | 4/1960 | Erasmus et al. | 263—30 |
| 3,190,245 | 6/1965 | Huntington | 263—30 X |
| 3,260,514 | 7/1966 | Asano et al. | 263—30 |

FREDERICK L. MATTESON, Jr., *Primary Examiner.*

J. J. CAMBY, *Examiner.*